(12) United States Patent
Gill

(10) Patent No.: US 8,533,095 B2
(45) Date of Patent: Sep. 10, 2013

(54) COMPUTER IMPLEMENTED METHOD AND APPARATUS FOR PROCESSING AUCTION BIDS

(75) Inventor: Andrew Gill, Apex, NC (US)

(73) Assignee: Siebel Systems, Inc., San Mateo, CA (US)

( * ) Notice: Subject to any disclaimer, the term of this patent is extended or adjusted under 35 U.S.C. 154(b) by 1498 days.

(21) Appl. No.: 10/118,647

(22) Filed: Apr. 8, 2002

(65) Prior Publication Data

US 2007/0226118 A1    Sep. 27, 2007

Related U.S. Application Data

(63) Continuation of application No. 09/846,334, filed on Apr. 30, 2001, now abandoned.

(51) Int. Cl.
*G06Q 40/00*    (2006.01)

(52) U.S. Cl.
USPC ............................. 705/37; 705/35; 705/36 R1

(58) Field of Classification Search
USPC .................. 705/37, 35, 36 R, 80, 168, 39, 1, 705/38
See application file for complete search history.

(56) References Cited

U.S. PATENT DOCUMENTS

| | | | | |
|---|---|---|---|---|
| 5,905,975 | A * | 5/1999 | Ausubel | 705/37 |
| 6,161,099 | A * | 12/2000 | Harrington et al. | 705/36 R |
| 6,243,691 | B1 * | 6/2001 | Fisher et al. | 705/37 |
| 6,366,891 | B1 | 4/2002 | Feinberg | 705/37 |
| 6,415,270 | B1 * | 7/2002 | Rackson et al. | 705/37 |
| 6,609,112 | B1 * | 8/2003 | Boarman et al. | 705/37 |
| 6,647,373 | B1 * | 11/2003 | Carlton-Foss | 705/37 |
| 2002/0065762 | A1 * | 5/2002 | Lee et al. | 705/37 |
| 2002/0082978 | A1 * | 6/2002 | Ghouri et al. | 705/37 |

OTHER PUBLICATIONS (Michael Miller, The complete Idiot's Guide to Ebay Online Auctions, pp. 1-286, copyright Jul. 1999).*

* cited by examiner

*Primary Examiner* — Ojo O Oyebisi
(74) *Attorney, Agent, or Firm* — Campbell Stephenson LLP

(57) ABSTRACT

Systems and methods for a computer-implemented auction bidding process that assigns a winning bid quantity and a winning bid amount to each bid in an ordered list of bids by a single resolution of the ordered bid list based on the maximum amount the bidder is willing to pay for the offered item(s). The bid list is ordered by one or more criteria, including the maximum amount to which the submitted bid may be increased via an autobid feature, and resolution of the bid list considers these criteria in assigning bid quantities and bid amounts to each bid.

30 Claims, 6 Drawing Sheets

COMPUTER IMPLEMENTED METHOD AND APPARATUS FOR PROCESSING AUCTION BIDS

The present patent application is a Continuation of prior application Ser. No. 09/846,334, filed Apr. 30, 2001, now abandoned, entitled AUCTION BIDDING METHOD.

TECHNICAL FIELD OF THE INVENTION

The present invention relates to an auction bidding method, and more particularly, but not exclusively, to a method of resolving an ordered list of bids in a single step, and in a manner which allocates a requested or available quantity of offered goods or services based on the maximum amount the bidder is willing to pay for the offered goods or services.

BACKGROUND OF THE INVENTION

With the advent of the Internet and electronic commerce, auction bidding methods and processes of resolving incoming bids to allocate available resources to the highest bidder have become varied and well known. The proliferation of computer-implemented auctions permits large numbers of individuals to participate in an auction process without gathering together at one physical location, or at any one particular time.

In addition, the computer-implementation of an auction allows individuals to continue to participate in the bidding process without the necessity of taking any action themselves. For example, an individual bidder may submit an initial bid for a particular offered good or service which may be less than the amount the bidder is actually willing to pay for the offered item. The bidder may at the same time activate an automatic bidding option, and indicate a maximum amount the bidder is willing to pay in the event that competing bids drive up the price of the offered item. By implementing an automatic bidding process such as this, the bidder need not continuously monitor the auction to determine when a higher bid must be submitted in order to stay in front of the competition.

Typical auction bidding methods accept each incoming bid, compare the bid against previously submitted bids, and assign a quantity of offered goods or services to the winning bids until the available quantities are exhausted. In the case in which the bidder's initial offer is lower than the maximum amount he or she is willing to pay for the offered item(s), an auto-bidding system is often implemented as described above. The auto-bidding feature is activated for each losing bid, adjusting the bid amount to an amount higher than the lowest winning bid (within the auto-bid's maximum which the bidder is willing to pay), and then re-resolving the bid list to again allocate the available quantities among the "new" list of winning bids. As this process is repeated for each successive losing bid in the bid list, the list may, depending on the number of bids, be resolved hundreds or thousands of times just to determine the actual winning bids based on the current list. When a new bid is then submitted, the process must repeat itself entirely, occupying valuable system resources.

SUMMARY OF THE ILLUSTRATED EMBODIMENTS

An aspect of the illustrated embodiments is to address the aforementioned problems and provide a method of resolving an ordered list of bids in a single step based on the maximum amount each bidder is willing to pay for the offered items, thereby resolving the bid list in a manner which more efficiently determines the winning bids and allocates the available quantities to the winning bid or bids.

The presently disclosed method implements a process by which a single resolution of the bid list assigns a bid quantity and a bid amount to each bid based on the maximum amount each bidder is willing to pay for the offered goods or services. The single resolution of the bid list considers the status of an automatic bidding feature in the auction process that an individual user may select, and which will allow the user's bid to be automatically increased to a specified amount. This process has the advantage of bypassing the sequential bid increases caused by the typical automatic bidding feature, by evaluating the bids based, in the first instance, on the bidder's maximum bid amount.

Other features of the present invention will be apparent to the reader from the foregoing and the appended claims, and as the ensuing detailed description and discussion is read in conjunction with the accompanying drawings.

BRIEF DESCRIPTION OF THE VARIOUS VIEWS OF THE DRAWINGS

In the drawings, like reference numerals refer to like parts throughout the various views of the non-limiting and non-exhaustive embodiments of the present invention, and wherein.

DETAILED DESCRIPTION OF THE ILLUSTRATED EMBODIMENTS

Embodiments of an auction bidding method, wherein winning amounts and winning quantities are assigned in a single resolution of the bid list, are described in detail herein. In the following description, numerous specific details are provided, such as the identification of various components of each of the processes involved in implementing the method, to provide a thorough understanding of embodiments of the invention. One skilled in the art will recognize, however, that the invention can be practiced without one or more of the specific details, or with other methods, components, materials, etc. In still other instances, well-known structures, materials, or operations are not shown or described in detail to avoid obscuring aspects of various embodiments of the invention.

Reference throughout this specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout this specification are not necessarily all referring to the same embodiment. Furthermore, the particular features, structures, or characteristics may be combined in any suitable manner in one or more embodiments.

The auction bidding method of the present invention and the illustrated embodiments may comprise a computer-readable medium containing a set of preprogrammed instructions, and may be implemented by a conventional microprocessor capable of executing a set of preprogrammed instructions necessary to carry out the particular steps of the processes more fully described herein below. The microprocessor may comprise an element of a server, the server also including memory, and an input/output section for information storage, and communication of information to and from the server, respectively. The submission of bids may, but need not necessarily, take place via the Internet or other network of computers. The following description of the auction bidding method of the present invention assumes that certain initialization data, as detailed more fully hereinbelow, is set by the offeror prior to the start of the bidding process.

Figure 1:
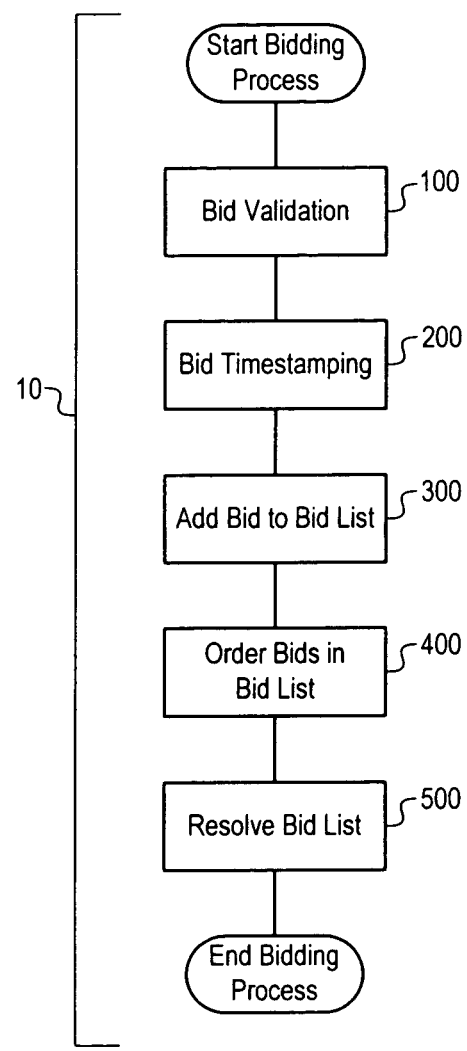
FIG. 1 is a flow diagram illustrating the high level sequential implementation of a bidding process.

Referring now to the drawings, and in particular to FIG. 1, there is illustrated a flow diagram showing the high level sequential implementation of an auction bidding process in accordance with the present invention and illustrated embodiments generally at 10.

The first step in the bidding process 10 is to validate a bidder's bid against an offer 100 (hereinafter referred to as "bid validation"). Bid validation 100 is followed by validating the bid against the bidder's prior bid 200 (hereinafter referred to as "bid timestamping"), adding the bid to a bid list 300, ordering the bid list 400, and resolving the bid list 500. Bid validation 100 generally comprises a process designed to ensure that the bid satisfies the minimum requirements set by the offer in terms of minimum bid amount and minimum bid quantity. These minimum requirements, along with other initialization data that will be set forth throughout the following description, may be implemented on an auction-wide basis, or may vary with individual offers.

The second step in the bidding process 10 is bid timestamping 200, generally comprising a process of assigning to each bid, a time at which the bid resolution step 500 will consider the bid to have been submitted (hereinafter referred to as a "bid timestamp"). A bid timestamp may become an issue during the bid resolution process 500 in the event that two or more bids have identical bid amounts, or in calculating winning bid amounts. The bid timestamp will comprise either a current system setting, or a system setting corresponding to a prior bid submitted by the same bidder.

The third step in the bidding process 10 is the addition of the newly submitted bid to the bid list 300. Addition of the bid to the bid list may comprise a process of adding the bid to the memory accessible by the microprocessor implementing the method of the present invention. In an embodiment, the memory may contain each of the bids that have been submitted, and their corresponding attributes, including bid amount, and bid quantity, as well as additional information that will be discussed in greater detail below. Following addition of the bid to the bid list 300, each (one or more) currently pending bid is ordered 400 to generate an ordered bid list. Following generation of the ordered bid list 400, resolution of the bid list 500 is undertaken wherein an available quantity of offered goods or services is assigned to each bid ("winning bid quantity") in the bid list based on the bid's specific attributes, along with a winning bid amount.

Having observed the general sequence of the bidding process 10, attention may now be given to the individual steps that make up embodiments of the general bidding process steps 100, 200, 300, 400 and 500 set forth above. Throughout the following discussion, examples may periodically be given in order to demonstrate to the reader how the bidding process of the present invention and the illustrated embodiments is implemented for a specified set of circumstances. These demonstrative examples are for purposes of illustration only, and should not be construed to limit the scope of the present invention or the illustrated embodiments to the specific examples given.

In order to facilitate a greater understanding of the illustrated embodiments of the present invention, following is a short explanation regarding the bid amount, and the autobid feature setting, both of which are discussed throughout this detailed description. The bid amount is actually the maximum amount the bidder is willing to pay for an offered item. The reader will appreciate that not in all instances will the bidder actually pay the maximum amount he or she is willing to pay for the offered item. The actual amount paid by the bidder for an offered item is assigned as the "winning bid amount" as part of the bid resolution process 500. The winning bid amount will be within the range of the minimum bid amount set by the offer initialization, and the bid's bid amount, corresponding to the maximum the bidder is willing to pay for an offered item. By activating the autobid feature setting, the bidder's bid will fluctuate, and be automatically increased to an amount necessary to receive the offered items the bidder is bidding on based on the current competing bids. If the autobid feature setting is inactive, the bid amount is static, remaining at the submitted bid amount throughout the bidding process 10.

Figure 2:
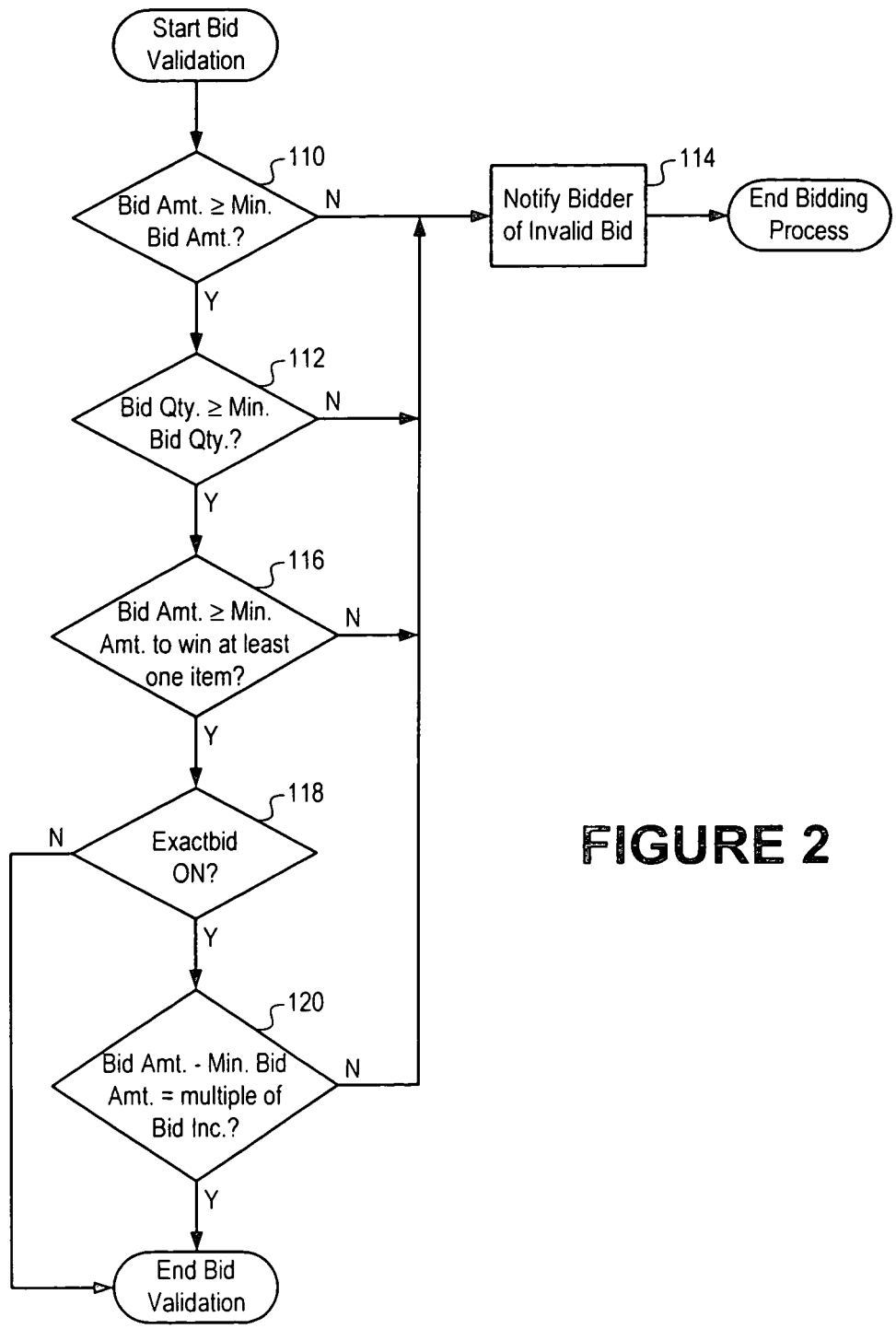
FIG. 2 is a flow diagram illustrating the sequential implementation of a process of validating a bid against an offer ("bid validation"), as shown in FIG. 1.

Turning our attention first to the bid validation process 100, and in particular to FIG. 2, bid validation 100 begins by comparing 110 the bid amount with the minimum bid amount set by the offer initialization prior to the start of the bidding process 10. The minimum bid amount corresponds to the least amount the offeror is willing to accept for an offered item. If the bid amount is greater than or equal to the minimum bid amount, then the bid validation process 100 proceeds to compare 112 the bid quantity with the minimum bid quantity also set by the offer initialization prior to the start of the bidding process 10. The minimum bid quantity, like the minimum bid amount, corresponds to the lowest number of offered items an individual must request in order to have a valid bid. If the bid amount comparison 110 finds that the submitted bid amount is less than the minimum bid amount, the bidder is notified that the submitted bid is invalid 114, and the bidding process 10 ends, awaiting the next bid submission.

If the bid quantity comparison 112 finds that the bid quantity is greater than or equal to the minimum bid quantity, then the bid validation process 100 proceeds, in an embodiment, to compare 116 the bid amount with the minimum amount that must currently be bid in order to win at least one offered item. If the bid quantity comparison 112 finds that the bid quantity is less than the minimum bid quantity, then, as with the bid amount comparison 110, the bidder is notified that the submitted bid is invalid 114, and the bidding process 10 ends, awaiting submission of the next bid.

The comparison 116 of the bid amount with the minimum amount that must currently be bid in order to win at least one offered item is designed such that a bidder may bid an amount equal to the offered price of an item (assuming the bid amount complies with the minimum bid amount set by the offer, as discussed above) when not all offered items have yet been assigned via the quantity assignment process of a prior resolution of an ordered bid list, discussed more fully below. Where no additional offered items remain at the offered price, the bid amount comparison 116 compares the bid amount with the lowest currently winning bid amount, as determined by a prior resolution of an ordered bid list. The lowest currently winning bid amount refers to the "winning bid amount" assigned in a previous resolution of the ordered bid list, to a bid or bids having a "winning bid quantity" of at least one offered item, and having the lowest "winning bid amount" of all such bids.

If the comparison 116 finds that the bid amount is greater than or equal to the minimum amount that must currently be bid in order to win at least one offered item, then the bid validation process 100 proceeds to check the status 118 of an exactbid initialization setting. If the comparison 116 finds that the bid amount is less than the minimum amount that must currently be bid in order to win at least one offered item, then the bidder is notified that the submitted bid is invalid 114, and the bidding process 10 ends, awaiting the next bid submission.

At initialization, the exactbid feature (see, e.g., step 118) is either activated or deactivated (or left inactive) by the offeror. Activation of this feature has the effect of requiring that each new bid submission be equal to the sum of the minimum bid amount and a non-negative integer multiple (e.g., 0, 1, 2, j 3 . . . n) of the bid increment. The bid increment corresponds to the minimum amount by which successive bids must be increased. If the exactbid initialization setting is off, the bid, having passed through the comparison steps 110, 112, and 116, is validated and the bidding process 10 (see FIG. 1) proceeds to the bid timestamping step 200. As indicated above, if the exactbid feature is activated, the bid validation process 100 proceeds to determine 120 if the bid amount is equal to the sum of the minimum bid amount and a non-negative integer multiple of the bid increment. If yes, then the bid is validated and the bidding process 10 proceeds to the bid timestamping step 200, otherwise the bidder is notified that the submitted bid is invalid 114, and the bidding process 10 ends, awaiting the next bid submission. The reader will appreciate that when at least one offered item remains available at the minimum bid amount, the bid amount need only comply with the minimum bid amount requirements of steps 110 and 116. Under such circumstances, the comparison at step 120 utilizes the "0" integer multiple of the bid increment such that the sum being compared in step 120 equals the minimum bid amount.

Figure 3:
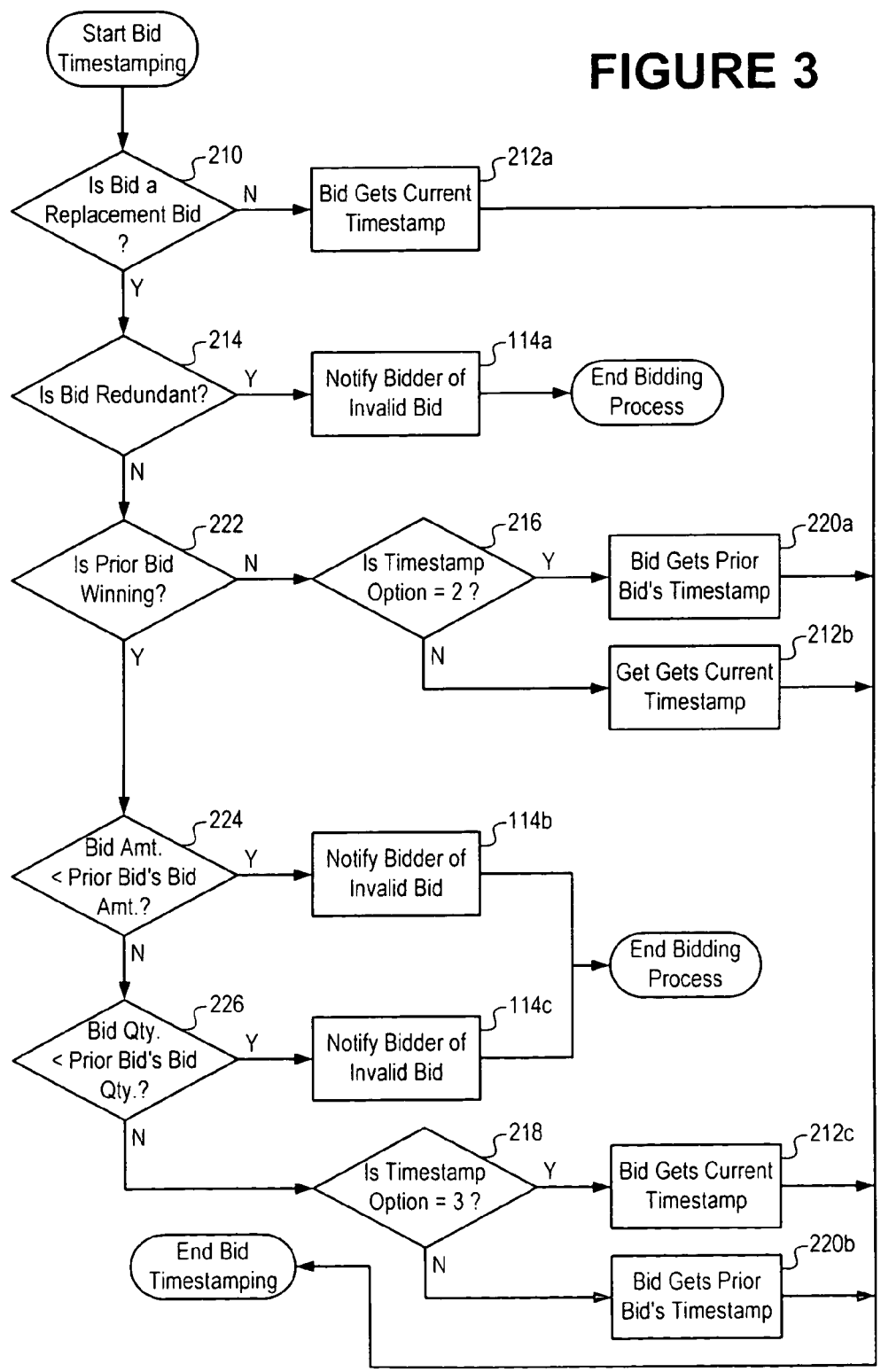
FIG. 3 is a flow diagram illustrating the sequential implementation of a process of validating the bid against a bidder's prior bid ("bid timestamping"), as shown in FIG. 1.

When bid validation 100 has been successfully completed, the bidding process 10 proceeds to the bid timestamping step 200 which is more fully described below with primary reference to FIG. 3. This process is designed to "timestamp" each incoming bid with a designation reflective of the time at which the bid was received by the auction bidding process 10. In an embodiment, each bid is timestamped with a bid timestamp corresponding to either the submission time of the user's previous bid ("timestamp of the previous bid submitted by the bidder," or "prior bid's timestamp"), or the time indicative of current system settings ("current timestamp").

The bid timestamping process 200 begins with the determination 210 of whether the bid is a replacement for a bid previously submitted by the same bidder. If the bid is not a replacement, but an original bid, the bid is timestamped with the current system settings 212a and the bidding process 10 proceeds to step 300, adding the bid to the bid list. If the bid is determined to be a replacement bid, the bid timestamping process 200 next determines 214 whether the bid is redundant (identical to the previously submitted bid). If the bid is redundant, the bidder is notified of an invalid bid 114a, and the bidding process 10 ends, awaiting the submission of the next bid. If the bid is not redundant, the timestamping process 200 proceeds to determine 222 if the bidder's prior bid is winning. Whether the bidder's prior bid is winning is a determination of whether the prior bid has been assigned a winning bid quantity of at least one offered item in a previous resolution of the ordered bid list. In such a case, it is not advantageous to the offeror to permit the bidder to submit a replacement bid having a bid amount or a bid quantity that is less than the prior bid.

If the prior bid is not winning, the timestamping process 200 proceeds to determine 216 if a timestamp option initialization setting equals "2." The timestamp option initialization setting is set by the offeror prior to beginning the bidding process 10, and may impact the timestamp given to each submitted bid. If the timestamp option initialization setting is set to "2," the newly submitted bid is timestamped with the timestamp of the prior bid 220a, otherwise the newly submitted bid is timestamped with the current system settings 212b. In either case, the bidding process 10 next proceeds with step 300, adding the bid to the bid list.

Where the prior bid is winning (see step 222), the timestamping process 200 compares 224 the bid amount of the newly submitted bid with the bid amount of the prior bid. If the newly submitted bid's bid amount is less than the prior bid's bid amount, the bidder is notified of an invalid bid 114b, and the bidding process 10 ends, awaiting the next bid submission. If the newly submitted bid's bid amount is greater than or equal to the prior bid's bid amount, the timestamping process 200 compares 226 the newly submitted bid's bid quantity with the bid quantity of the prior bid. If the bid quantity of the newly submitted bid is less than the bid quantity of the prior bid, the bidder is notified of an invalid bid 114c, and the bidding process 10 ends, awaiting submission of the next bid. If the bid quantity of the newly submitted bid is greater than or equal to the prior bid's bid quantity, then the timestamping process 200 proceeds to determine 218 if the timestamp option initialization setting equals "3."

If the timestamp option initialization setting equals "3," the newly submitted bid is timestamped with the current system settings 212c, otherwise the newly submitted bid is timestamped with the timestamp of the prior bid 220b. In either event, the bidding process 10 next proceeds to step 300, adding the bid to the bid list.

Figure 4:
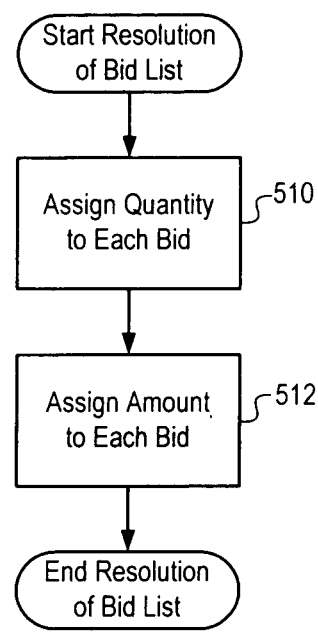
FIG. 4 is a flow diagram illustrating the high level sequential implementation of a process of resolving a bid list, as shown in FIG. 1.

When bid timestamping 200 has been successfully completed, the bidding process proceeds to step 300, adding the bid to the bid list. As mentioned previously, the addition of the bid to the bid list may comprise storing the bid in a memory accessible by a microprocessor implementing an embodiment of the present invention. Following addition of the bid to the bid list 300, step 400 is initiated, and the bid list is ordered from a first bid having a highest bid amount to a last bid having a lowest bid amount, and from a first bid having an earliest timestamp to a last bid having a latest timestamp in the event that two or more bids in the bid list have identical bid amounts. Following ordering of the bid list at step 400, the ordered bid list is resolved 500 to assign a winning quantity to each bid 510 (see FIG. 4), and a winning amount to each bid 512 (see FIG. 4) in the ordered bid list.

Figure 5:
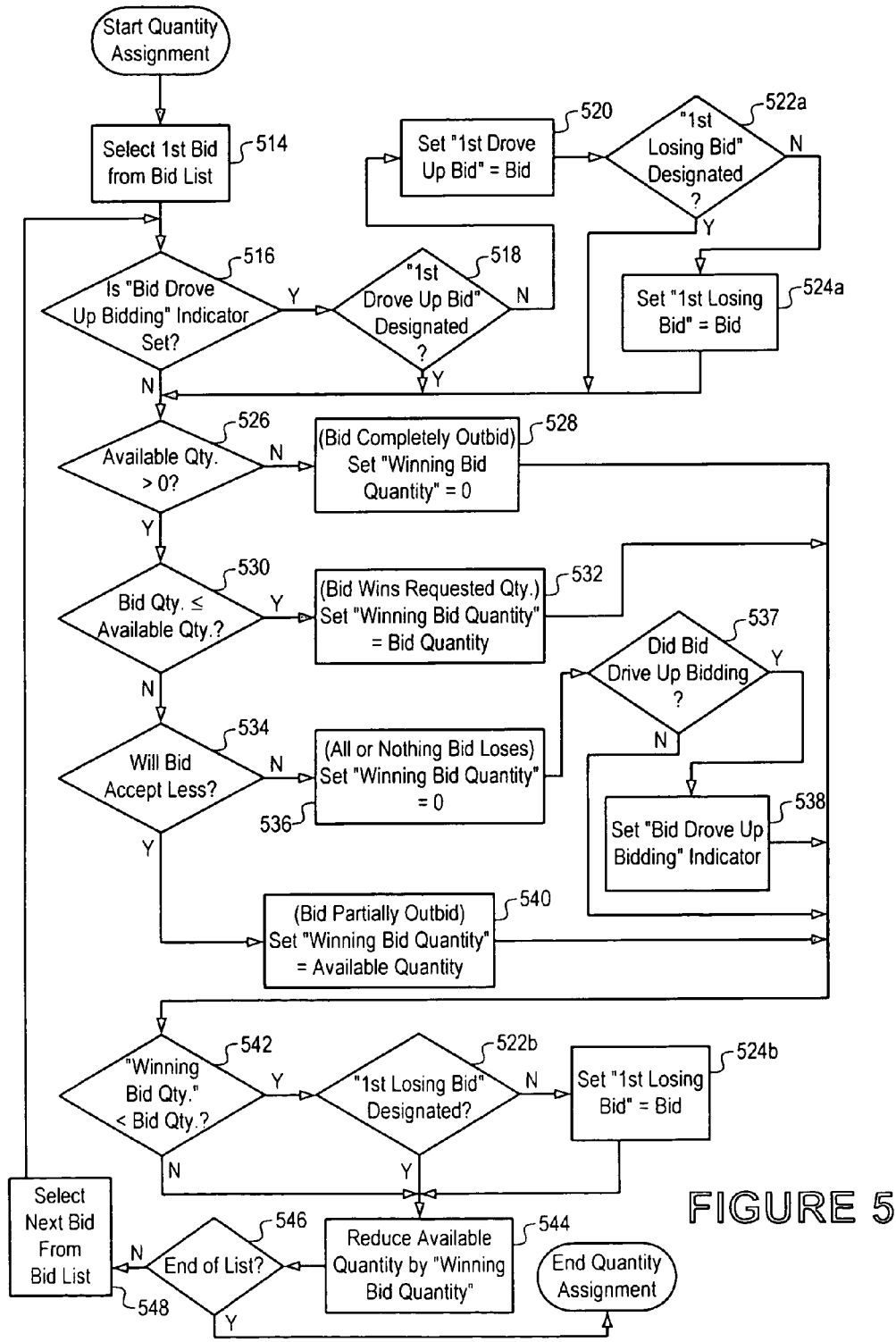
FIG. 5 is a flow diagram illustrating the sequential implementation of a process of assigning a quantity to each bid in the bid list, as shown in FIG. 4.

With reference now primarily to FIG. 5, the bid resolution process 500 begins with the assignment of a quantity of the offered item(s) to each bid in the ordered bid list 510 (hereinafter "quantity assignment process," or "process"). The quantity assignment process 510 is designed to assign a winning bid quantity to each bid in the ordered bid list. Although referred to as the "winning bid quantity," the bid may not actually receive any of the offered items, such as when the "winning bid quantity" is assigned zero. The first bid in the ordered bid list is selected 514, and the quantity assignment process 510 proceeds to determine 516 whether the "bid drove up bidding" indicator has been set to "TRUE." The "bid drove up bidding" indicator is set to "TRUE" for a bid that: Triggers activation of the autobid feature in any other bid(s) in the ordered bid list; and is assigned a winning bid quantity equal to zero because the bid will not "accept less." The indicator will be set for each bid that meets the aforementioned criteria.

The accept-less feature setting is set by the individual bidder upon submitting a bid. By activating the accept-less feature setting, the bidder acknowledges that he or she is willing to accept a winning bid quantity that is less than the bid quantity he or she is requesting with the bid. If the bidder is unwilling to "accept less," the bid will be assigned a winning bid quantity of "0" in the event that the available quantity is less than the bid quantity.

If the "bid drove up bidding" indicator has been set to "TRUE" for the bid, the quantity assignment process 510 proceeds to determine 518 if a first drove up bid ("$1^{st}$ drove up bid") has already been designated, otherwise the quantity assignment process 510 proceeds with a check 526 of the available quantity of offered items remaining. If a "$1^{st}$ drove up bid" has been designated, the process 510 proceeds to step 526 as indicated above. If a "$1^{st}$ drove up bid" has not yet been designated, the quantity assignment process 510 proceeds to designate 520 the current bid as the "$1^{st}$ drove up bid." Following step 520, the process 510 determines 522a whether a first losing bid ("$1^{st}$ losing bid") has been designated, and if not, the current bid is also designated 524a as the "$1^{st}$ losing bid." If the "$1^{st}$ losing bid" has already been designated, the process 510 proceeds to step 526 as indicated above to check the available quantity of offered items remaining. The "$1^{st}$ losing bid" is defined as the first bid in the bid list to be assigned a winning bid quantity that is less than the bid quantity requested. Only one bid is designated as a "$1^{st}$ losing bid," and only one bid is designated as a "$1^{st}$ drove up bid" during any one resolution of the ordered bid list (including both quantity assignment 510 and amount assignment 512), whereas the "bid drove up bidding" indicator may be set for more than one bid, as mentioned previously. These designations ("$1^{st}$ losing bid" & "$1^{st}$ drove up bid"), as well as the "bid drove up bidding" indicator, apply to a single resolution of the ordered bid list, and are reset at the end of the resolution process 500 (see FIG. 1).

If the available quantity of offered items remaining is greater than zero (see step 526), the quantity assignment process 510 proceeds to compare 530 the bid quantity with the available quantity of offered items remaining, otherwise the bid is completely outbid, and the bid is assigned 528 a winning bid quantity of zero. If the bid quantity is less than or equal to the available quantity of offered items remaining, then the bid wins the requested bid quantity and the bid is assigned 532 a winning bid quantity equal to the bid quantity, otherwise the process 510 proceeds to determine 534 whether the bid will "accept less." If the bid will "accept less," then the bid is only partially outbid, and the bid is assigned 540 a winning bid quantity equal to the available quantity of offered items remaining. If the bid will not "accept less," then the bid loses entirely, and the bid is assigned 536 a winning bid quantity of zero.

In the event that the bid is assigned a winning bid quantity of zero at step 536 because the bid will not "accept less," then the quantity assignment process 510 proceeds to determine 537 if the bid drove up bidding. If the bid did drive up bidding, as discussed previously, then the "bid drove up bidding" indicator is set to "TRUE" 538.

Following any one of steps 528, 532, 538, or 540, the quantity assignment process 510 proceeds to compare the assigned winning bid quantity with the bid quantity requested. As indicated previously, if the bid is assigned a winning bid quantity that is less than the bid quantity requested, then the process 510 proceeds to determine 522b whether the "$1^{st}$ losing bid" has been set, and if not, the bid is designated as the "$1^{st}$ losing bid" 524b. Following either step 524b, or 542, the quantity assignment process 510 proceeds to reduce the available quantity of offered items remaining by the winning bid quantity assigned to the bid 544.

If the end of the list has not yet been reached (per step 546), the process 510 selects the next bid from the bid list 548 and repeats the process again beginning at step 516. If the end of the list has been reached (per step 546), the quantity assignment process 510 is complete, and the resolution of the bid list 500 proceeds with the amount assignment process 512 described in greater detail hereinbelow.

Figure 6:
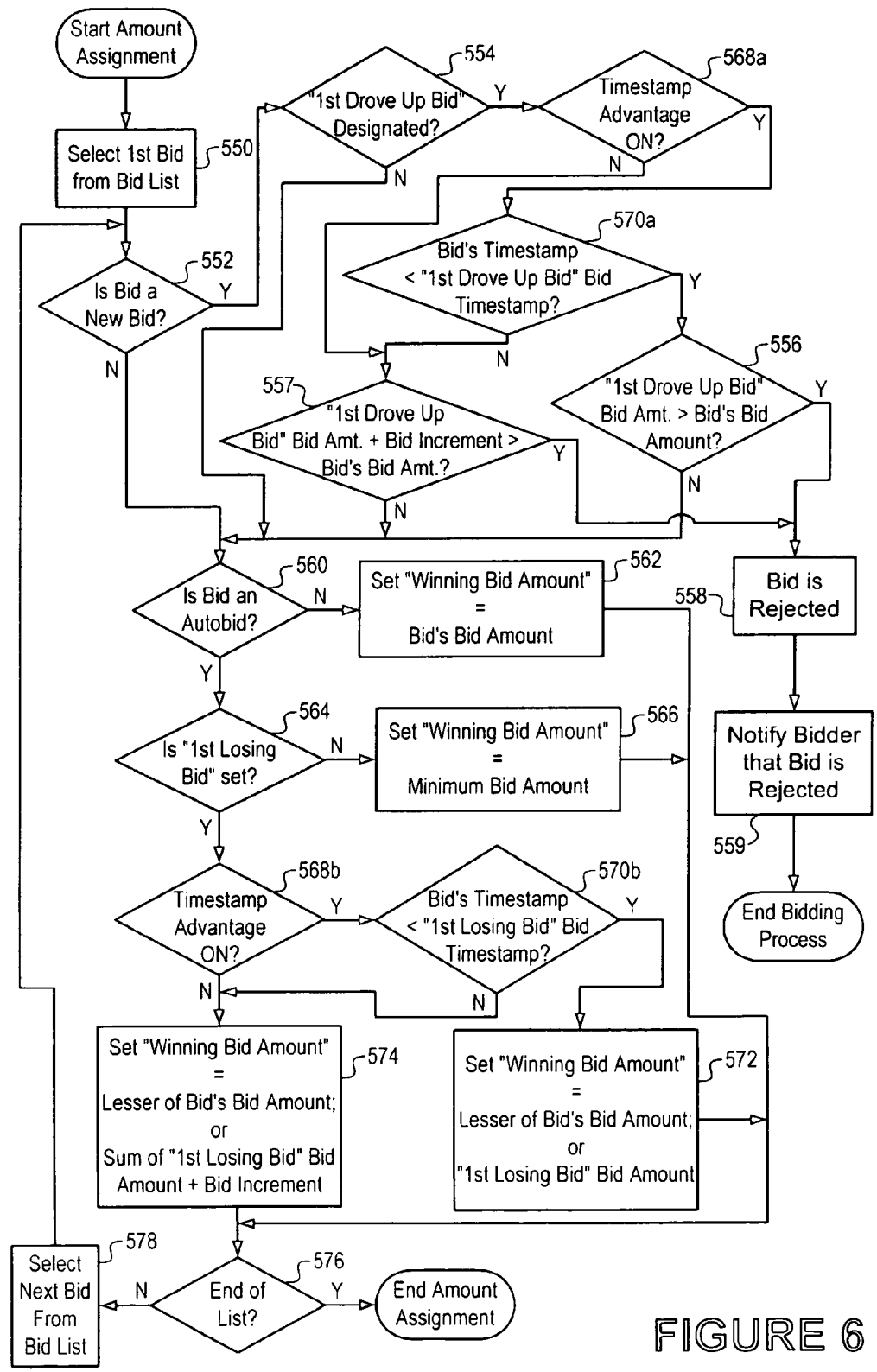
FIG. 6 is a flow diagram illustrating the sequential implementation of a process of assigning an amount to each bid in the bid list, as shown in FIG. 4.

With reference now primarily to FIG. 6, the amount assignment process 512 begins by selecting the first bid in the ordered bid list 550, and determining 552 whether the bid is a new bid, meaning the most recently submitted bid for which a resolution of the bid list is being undertaken. The reader will understand that each time a "new" bid is submitted to the bidding process 10, it is taken through the various steps of the process 100, 200, and 300 at which point the newly submitted bid is added to the bid list, and the bid list is ordered 400 and resolved 500. If the bid is a new bid, the amount assignment process 512 proceeds to determine 554 if a "$1^{st}$ drove up bid" has been designated. If the bid is not a new bid (see step 552), or if a "$1^{st}$ drove up bid" has not been designated (see step 554), then the amount assignment process 512 proceeds to check 560 the status of the autobid feature setting for the bid.

Where a "$1^{st}$ drove up bid" has been designated (see step 554), the process 512 proceeds to check 568a the status of a timestamp advantage feature setting. The timestamp advantage feature is set by the offer initialization, and refers to a bidding advantage given to earlier timestamps. When the timestamp advantage feature is activated, a first bid having an earlier timestamp than a second bid, need only increase the amount of its bid via the autobid feature to an amount equal to the second bid, as opposed to an amount equal to the sum of the second bid and the bid increment when the timestamp advantage is inactive.

If the check 568a of the status of the timestamp advantage feature setting determines that the timestamp advantage feature is activated, the process 512 proceeds to compare 570a the bid's timestamp with the timestamp of the bid designated as the "$1^{st}$ drove up bid." If the bid's timestamp is less than (referring to older, e.g., on a scale of time beginning at t=1, and proceeding with t=2, t=3, etc.) the timestamp of the bid designated as the "$1^{st}$ drove up bid," then the amount assignment process 512 proceeds to compare 556 the "$1^{st}$ drove up bid" bid amount with the bid's bid amount. If the "$1^{st}$ drove up bid" bid amount is greater than the bid's bid amount, the bid is rejected 558, the bidder is notified that the bid has been rejected 559, and the bidding process 10 ends, awaiting submission of the next bid, otherwise the amount assignment process 512 proceeds to check 560 the status of the autobid feature setting for the bid.

If the timestamp advantage feature is inactive (see step 568a), or if the bid's timestamp is greater than (submitted later) the timestamp of the bid designated as the "$1^{st}$ drove up bid" ("first drove up bid's timestamp") (see step 570a), then the amount assignment process 512 proceeds to compare 557 the sum of the "$1^{st}$ drove up bid" bid amount and the bid increment with the bid's bid amount. If the sum of the "$1^{st}$ drove up bid" bid amount and the bid increment is greater than the bid's bid amount, then the bid is rejected 558, the bidder is notified that the bid has been rejected 559, and the bidding process 10 ends, awaiting submission of the next bid. If the sum of the "$1^{st}$ drove up bid" bid amount and the bid increment is less than or equal to the bid's bid amount, the amount assignment process proceeds to check 560 the status of the autobid feature setting for the bid.

At this point, the bid has either been rejected (see step 558), or has been maintained, and the process 512 has progressed to step 560 to determine whether the autobid feature has been activated for the bid. If the autobid feature is inactive, then the bid is assigned 562 a winning bid amount equal to the bid's bid amount. If the autobid feature is activated, then the amount assignment process 512 proceeds to step 564 to determine whether a bid has been designated as a "$1^{st}$ losing bid" by the quantity assignment process 510. It should be noted that a winning bid amount will be assigned in the amount assignment process 512 to each bid in the ordered bid list, including those that were assigned a winning bid quantity equal to zero in the quantity assignment process 510.

Where no bid has been designated as a "$1^{st}$ losing bid," a sufficient quantity of offered items is still available to satisfy the bid quantities of all currently pending bids, and the bid is assigned 566 a winning bid amount equal to the minimum bid amount set by the offer initialization. Where a bid has been designated as a "$1^{st}$ losing bid," the amount assignment process 512 proceeds to check 568b the status of the timestamp advantage feature setting as discussed previously.

If the timestamp advantage feature is activated, the amount assignment process 512 proceeds to compare 570b the bid's timestamp with the timestamp of the bid designated as the "$1^{st}$ losing bid." If the bid's timestamp is less than (submitted earlier) the timestamp of the bid designated as the "$1_{st}$ losing bid," then the process 512 proceeds to assign 572 to the bid a winning bid amount equal to the lesser of either the bid's bid amount, or the bid amount of the bid designated as the "$1^{st}$ losing bid." If the timestamp advantage feature (see step 568b) is inactive, or the bid's timestamp is greater than (submitted later) the timestamp of the bid designated as the "$1^{st}$ losing bid," then the amount assignment process 512 proceeds to assign 574 a winning bid amount to the bid equal to the lesser of either the bid's bid amount, or the sum of the bid amount of the bid designated as the "$1^{st}$ losing bid" and the bid increment.

Following assignment of a winning bid amount to the bid at step 562, 566, 572, or 574, the amount assignment process 512 proceeds to determine 576 if additional bids remain in the bid list, and if so, to select 578 the next bid from the bid list and repeat the preceding process 512 beginning at step 552. If the end of the bid list has been reached (see step 576), then the amount assignment process 512 ends, ending the process of resolving the bid list 500, and ending the bidding process 10.

The bidding process described above assumes that each bidder will have only a single bid in the ordered bid list for resolution. Where multiple bids per bidder are desired, the reader will appreciate that the process will be identical, and each bid, because it is not replacing another prior bid, will be timestamped with the current system setting.

Other typical auction bidding methods are also compatible with the process described above. For example, a reverse bidding process may also be performed by reversing the comparison of amounts throughout the bidding process 10. A reverse auction may be an auction in which the offeror requests some product or service, and the winners are designated as those bidder's willing to sell the product or service for the lowest amount. In such a scenario, the ordered bid list is generated by ordering the bids from a first bid having a lowest bid amount to a last bid having a highest bid amount, with timestamps being considered in the same manner as they are in a standard forward auction bidding process.

While the invention is described and illustrated here in the context of a limited number of embodiments, the invention may be embodied in many forms without departing from the spirit of the essential characteristics of the invention. The illustrated and described embodiments, including what is described in the abstract of the disclosure, are therefore to be considered in all respects as illustrative and not restrictive. The scope of the invention is indicated by the appended claims rather than by the foregoing description, and all changes which come within the meaning and range of equivalency of the claims are intended to be embraced therein.

What is claimed is:

1. A computer-implemented method comprising:
    electronically storing data corresponding to each of a plurality of currently pending bids for an auction, wherein the plurality of currently pending bids comprises
    a plurality of bids that use an optional automatic bidding feature, and
    a plurality of bids that do not use the optional automatic bidding feature;
    determining, using a processor of a server computer, for the each of the currently pending bids, whether or not a corresponding bidder has selected that the currently pending bid use the optional automatic bidding feature;
    generating an ordered bid list by ordering the plurality of currently pending bids by criteria comprising
      for each currently pending bid using the optional automatic bidding feature, a maximum amount to which the bid may be increased via the optional automatic bidding feature, and
      for each currently pending bid not using the optional automatic bidding feature, a static bid amount;
    assigning a winning bid quantity and a winning bid amount to each bid in the ordered bid list based on an ordering of the bid list; and
    using an input/output section of the server computer to communicate at least one of the winning bid quantities and at least one of the winning bid amounts to the corresponding bidder.

2. The computer-implemented method of claim 1, further comprising:
    after the assigning, awaiting a subsequent bid submission.

3. The computer-implemented method of claim 1, further comprising:
    receiving a bid;
    ascertaining whether the bid is a replacement bid for a previous bid;
    if the bid is not a replacement bid, timestamping the bid with a current computer-generated timestamp; and
    if the bid is a replacement bid, identifying a timestamping condition selected by an offeror of the auction, and electronically timestamping the bid with either the current computer-generated timestamp or a timestamp of the previous bid, based on the selected timestamping condition.

4. The computer-implemented method of claim 3, wherein the generating the ordered bid list comprises:
    ordering the each bid in the ordered bid list from a first bid having a highest bid amount to a last bid having a lowest bid amount; and if two or more bids in the bid list have an identical bid amount, ordering the two or more bids from a first bid having an earliest timestamp to a last bid having a latest timestamp.

5. The computer-implemented method of claim 1, wherein the assigning the winning bid quantity to the each bid in the ordered bid list comprises:
   (a) selecting a bid from the ordered bid list, wherein the selected bid comprises a bid quantity;
   (b) comparing the bid quantity with an available quantity;
   (c) if the bid quantity is greater than the available quantity, determining whether the selected bid will accept less than the bid quantity;
   (d) assigning a winning bid quantity to the selected bid;
   (e) if the winning bid quantity is less than the bid quantity, determining whether the selected bid is a first losing bid, and if the selected bid is the first losing bid, designating the selected bid as the first losing bid;
   (f) reducing the available quantity by the winning bid quantity; and
   if additional bids remain in the ordered bid list, selecting the next bid from the ordered bid list and repeating steps (b)-(f).

6. The computer-implemented method of claim 1, wherein the assigning the winning bid amount to the each bid in the ordered bid list comprises:
   (a) selecting a bid from the ordered bid list, wherein the selected bid comprises a bid timestamp;
   (b) identifying whether the selected bid uses the optional automatic bidding feature;
   (c) if the selected bid uses the optional automatic bidding feature, identifying whether a first losing bid has been designated;
   (d) if the first losing bid has been designated, identifying a timestamp advantage feature condition selected by an offeror of the auction;
   (e) if the timestamp advantage feature condition is active, comparing the bid timestamp with a bid timestamp of the first losing bid;
   (f) assigning a winning bid amount to the selected bid; and
   if additional bids remain in the ordered bid list, selecting the next bid from the ordered bid list and repeating steps (b)-(f).

7. A computer-readable storage medium storing a set of instructions executable by a processor to perform a method comprising:
   electronically storing data corresponding to each of a plurality of currently pending bids for an auction, wherein the plurality of currently pending bids comprises a plurality of bids that use an optional automatic bidding feature and a plurality of bids that do not use the optional automatic bidding feature;
   determining, for the each of the currently pending bids, whether or not a corresponding bidder has selected that the bid use the optional automatic bidding feature;
   generating an ordered bid list by ordering the plurality of currently pending bids by criteria comprising
      for each currently pending bid using the optional automatic bidding feature, a maximum amount to which the bid may be increased via the optional automatic bidding feature, and
      for each currently pending bid not using the optional automatic bidding feature, a static bid amount; and
   assigning a winning bid quantity and a winning bid amount to each bid in the ordered bid list based on an ordering of the bid list.

8. A system comprising:
   a microprocessor; and
   a memory, wherein the microprocessor is configured to implement a set of preprogrammed instructions stored in the memory to perform a method comprising
      electronically storing data corresponding to each of a plurality of currently pending bids for an auction, wherein the plurality of currently pending bids comprises a plurality of bids that use an optional automatic bidding feature and a plurality of bids that do not use the optional automatic bidding feature;
      determining, for the each of the currently pending bids, whether or not a corresponding bidder has selected that the bid use the optional automatic bidding feature;
      generating an ordered bid list by ordering the plurality of currently pending bids by criteria comprising
         for each currently pending bid using the optional automatic bidding feature, a maximum amount to which the bid may be increased via the optional automatic bidding feature, and
         for each currently pending bid not using the optional automatic bidding feature, a static bid amount; and
      assigning a winning bid quantity and a winning bid amount to each bid in the ordered bid list based on an ordering of the bid list.

9. The computer-implemented method of claim 1, further comprising:
   receiving a new bid in the auction;
   rejecting the new bid if a previous bid in the auction drove up a bidding amount, a timestamp advantage feature condition selected by an offeror of the auction is active, a timestamp of the new bid is earlier than a timestamp of the previous bid that drove up the bidding amount, and a bid amount of the previous bid that drove up the bidding amount is greater than a bid amount of the new bid; and
   rejecting the new bid if the previous bid in the auction drove up the bidding amount, the timestamp advantage feature condition selected by the offeror of the auction is not active, and a sum of a bid increment and the bid amount of the previous bid that drove up the bidding amount is greater than the bid amount of the new bid.

10. The computer-implemented method of claim 5, wherein the assigning the winning bid quantity to the selected bid comprises:
   if the available quantity is zero, assigning the winning bid quantity to be zero;
   if the available quantity is greater than zero and the bid quantity is less than or equal to the available quantity, assigning the winning bid quantity to be the bid quantity;
   if the available quantity is greater than zero, the bid quantity is greater than the available quantity, and a corresponding bidder for the selected bid has selected not to accept less than the bid quantity, assigning the winning bid quantity to be zero; and
   if the available quantity is greater than zero, the bid quantity is greater than the available quantity, and the corresponding bidder for the selected bid has selected to accept less than the bid quantity, assigning the winning bid quantity to be the available quantity.

11. The computer-implemented method of claim 10, wherein the assigning the winning bid quantity to the selected bid further comprises:
   if the available quantity is greater than zero, the bid quantity is greater than the available quantity, and the corresponding bidder for the selected bid has selected not to accept less than the bid quantity, determining whether the bid drove up a bidding amount.

12. The computer-implemented method of claim 6, wherein the assigning the winning bid amount to the selected bid comprises:
- if the selected bid does not use the optional automatic bidding feature, assigning the winning bid amount to be the static bid amount for the selected bid;
- if the selected bid uses the optional automatic bidding feature and the first losing bid has not been designated, assigning the winning bid amount to be a minimum bid amount that the offeror of the auction is willing to accept for one item in the auction;
- if the selected bid uses the optional automatic bidding feature, the first losing bid has been designated, the timestamp advantage feature condition selected by the offeror of the auction is active, and the bid timestamp of the selected bid is earlier than the bid timestamp of the first losing bid, assigning the winning bid amount to be a lesser amount among
  - the maximum amount for the selected bid, or
  - a bid amount of the first losing bid; and
- if the selected bid uses the optional automatic bidding feature, the first losing bid has been designated, the timestamp advantage feature condition selected by the offeror of the auction is active, and the bid timestamp of the selected bid is later than the bid timestamp of the first losing bid, assigning the winning bid amount to be a lesser amount among
  - the maximum amount for the selected bid, or
  - a sum of a bid increment and the bid amount of the first losing bid.

13. The computer-readable medium of claim 7, wherein the method further comprises:
- after the assigning, awaiting a subsequent bid submission.

14. The computer-readable medium of claim 7, wherein the method further comprises:
- receiving a bid;
- ascertaining whether the bid is a replacement bid for a previous bid;
- if the bid is not a replacement bid, timestamping the bid with a current computer-generated timestamp; and
- if the bid is a replacement bid, identifying a timestamping condition selected by an offeror of the auction, and electronically timestamping the bid with either the current computer-generated timestamp or a timestamp of the previous bid, based on the selected timestamping condition.

15. The computer-readable medium of claim 14, wherein the generating the ordered bid list comprises:
- ordering the each bid in the ordered bid list from a first bid having a highest bid amount to a last bid having a lowest bid amount; and
- if two or more bids in the bid list have an identical bid amount, ordering the two or more bids from a first bid having an earliest timestamp to a last bid having a latest timestamp.

16. The computer-readable medium of claim 7, wherein the assigning the winning bid quantity to the each bid in the ordered bid list comprises:
- (a) selecting a bid from the ordered bid list, wherein the selected bid comprises a bid quantity;
- (b) comparing the bid quantity with an available quantity;
- (c) if the bid quantity is greater than the available quantity, determining whether the selected bid will accept less than the bid quantity;
- (d) assigning a winning bid quantity to the selected bid;
- (e) if the winning bid quantity is less than the bid quantity, determining whether the selected bid is a first losing bid, and if the selected bid is the first losing bid, designating the selected bid as the first losing bid;
- (f) reducing the available quantity by the winning bid quantity; and
- if additional bids remain in the ordered bid list, selecting the next bid from the ordered bid list and repeating steps (b)-(f).

17. The computer-readable medium of claim 16, wherein the assigning the winning bid quantity to the selected bid comprises:
- if the available quantity is zero, assigning the winning bid quantity to be zero;
- if the available quantity is greater than zero and the bid quantity is less than or equal to the available quantity, assigning the winning bid quantity to be the bid quantity;
- if the available quantity is greater than zero, the bid quantity is greater than the available quantity, and a corresponding bidder for the selected bid has selected not to accept less than the bid quantity, assigning the winning bid quantity to be zero; and
- if the available quantity is greater than zero, the bid quantity is greater than the available quantity, and the corresponding bidder for the selected bid has selected to accept less than the bid quantity, assigning the winning bid quantity to be the available quantity.

18. The computer-readable medium of claim 17, wherein the assigning the winning bid quantity to the selected bid further comprises:
- if the available quantity is greater than zero, the bid quantity is greater than the available quantity, and the corresponding bidder for the selected bid has selected not to accept less than the bid quantity, determining whether the bid drove up a bidding amount.

19. The computer-readable medium of claim 7, wherein the assigning the winning bid amount to the each bid in the ordered bid list comprises:
- (a) selecting a bid from the ordered bid list, wherein the selected bid comprises a bid timestamp;
- (b) identifying whether the selected bid uses the optional automatic bidding feature;
- (c) if the selected bid uses the optional automatic bidding feature, identifying whether a first losing bid has been designated;
- (d) if the first losing bid has been designated, identifying a timestamp advantage feature condition selected by an offeror of the auction;
- (e) if the timestamp advantage feature condition is active, comparing the bid timestamp with a bid timestamp of the first losing bid;
- (f) assigning a winning bid amount to the selected bid; and
- if additional bids remain in the ordered bid list, selecting the next bid from the ordered bid list and repeating steps (b)-(f).

20. The computer-readable medium of claim 19, wherein the assigning the winning bid amount to the selected bid comprises:
- if the selected bid does not use the optional automatic bidding feature, assigning the winning bid amount to be the static bid amount for the selected bid;
- if the selected bid uses the optional automatic bidding feature and the first losing bid has not been designated, assigning the winning bid amount to be a minimum bid amount that the offeror of the auction is willing to accept for one item in the auction;
- if the selected bid uses the optional automatic bidding feature, the first losing bid has been designated, the timestamp advantage feature condition selected by the offeror of the auction is active, and the bid timestamp of the selected bid is earlier than the bid timestamp of the first losing bid, assigning the winning bid amount to be a lesser amount among the maximum amount for the selected bid, or
a bid amount of the first losing bid; and if the selected bid uses the optional automatic bidding feature, the first losing bid has been designated, the timestamp advantage feature condition selected by the offeror of the auction is active, and the bid timestamp of the selected bid is later than the bid timestamp of the first losing bid, assigning the winning bid amount to be a lesser amount among the maximum amount for the selected bid, or
a sum of a bid increment and the bid amount of the first losing bid.

21. The computer-readable medium of claim 7, the method further comprising:

receiving a new bid in the auction;

rejecting the new bid if a previous bid in the auction drove up a bidding amount, a timestamp advantage feature condition selected by an offeror of the auction is active, a timestamp of the new bid is earlier than a timestamp of the previous bid that drove up the bidding amount, and a bid amount of the previous bid that drove up the bidding amount is greater than a bid amount of the new bid; and rejecting the new bid if the previous bid in the auction drove up the bidding amount, the timestamp advantage feature condition selected by the offeror of the auction is not active, and a sum of a bid increment and the bid amount of the previous bid that drove up the bidding amount is greater than the bid amount of the new bid.

22. The system of claim 8, wherein the method further comprises:

after the assigning, awaiting a subsequent bid submission.

23. The system of claim 8, wherein the method further comprises:

receiving a bid;

ascertaining whether the bid is a replacement bid for a previous bid;

if the bid is not a replacement bid, timestamping the bid with a current computer-generated timestamp; and if the bid is a replacement bid, identifying a timestamping condition selected by an offeror of the auction, and electronically timestamping the bid with either the current computer-generated timestamp or a timestamp of the previous bid, based on the selected timestamping condition.

24. The system of claim 23, wherein the generating the ordered bid list comprises:

ordering the each bid in the ordered bid list from a first bid having a highest bid amount to a last bid having a lowest bid amount; and if two or more bids in the bid list have an identical bid amount, ordering the two or more bids from a first bid having an earliest timestamp to a last bid having a latest timestamp.

25. The system of claim 8, wherein the assigning the winning bid quantity to the each bid in the ordered bid list comprises:

(a) selecting a bid from the ordered bid list, wherein the selected bid comprises a bid quantity;

(b) comparing the bid quantity with an available quantity;

(c) if the bid quantity is greater than the available quantity, determining whether the selected bid will accept less than the bid quantity;

(d) assigning a winning bid quantity to the selected bid;

(e) if the winning bid quantity is less than the bid quantity, determining whether the selected bid is a first losing bid, and if the selected bid is the first losing bid, designating the selected bid as the first losing bid;

(f) reducing the available quantity by the winning bid quantity; and if additional bids remain in the ordered bid list, selecting the next bid from the ordered bid list and repeating steps (b)-(f).

26. The system of claim 25, wherein the assigning the winning bid quantity to the selected bid comprises:

if the available quantity is zero, assigning the winning bid quantity to be zero;

if the available quantity is greater than zero and the bid quantity is less than or equal to the available quantity, assigning the winning bid quantity to be the bid quantity;

if the available quantity is greater than zero, the bid quantity is greater than the available quantity, and a corresponding bidder for the selected bid has selected not to accept less than the bid quantity, assigning the winning bid quantity to be zero; and if the available quantity is greater than zero, the bid quantity is greater than the available quantity, and the corresponding bidder for the selected bid has selected to accept less than the bid quantity, assigning the winning bid quantity to be the available quantity.

27. The system of claim 26, wherein the assigning the winning bid quantity to the selected bid further comprises:

if the available quantity is greater than zero, the bid quantity is greater than the available quantity, and the corresponding bidder for the selected bid has selected not to accept less than the bid quantity, determining whether the bid drove up a bidding amount.

28. The system of claim 8, wherein the assigning the winning bid amount to the each bid in the ordered bid list comprises:

(a) selecting a bid from the ordered bid list, wherein the selected bid comprises a bid timestamp;

(b) identifying whether the selected bid uses the optional automatic bidding feature;

(c) if the selected bid uses the optional automatic bidding feature, identifying whether a first losing bid has been designated;

(d) if the first losing bid has been designated, identifying a timestamp advantage feature condition selected by an offeror of the auction;

(e) if the timestamp advantage feature condition is active, comparing the bid timestamp with a bid timestamp of the first losing bid;

(f) assigning a winning bid amount to the selected bid; and if additional bids remain in the ordered bid list, selecting the next bid from the ordered bid list and repeating steps (b)-(f).

29. The system of claim 8, wherein the method further comprises:

receiving a new bid in the auction;

rejecting the new bid if a previous bid in the auction drove up a bidding amount, a timestamp advantage feature condition selected by an offeror of the auction is active, a timestamp of the new bid is earlier than a timestamp of the previous bid that drove up the bidding amount, and a bid amount of the previous bid that drove up the bidding amount is greater than a bid amount of the new bid; and rejecting the new bid if the previous bid in the auction drove up the bidding amount, the timestamp advantage feature condition selected by the offeror of the auction is not active, and a sum of a bid increment and the bid amount of the previous bid that drove up the bidding amount is greater than the bid amount of the new bid.

30. A system comprising:

means for electronically storing data corresponding to each of a plurality of currently pending bids for an auction, wherein the plurality of currently pending bids comprises a plurality of bids that use an optional automatic bidding feature and a plurality of bids that do not use the optional automatic bidding feature;

a computing device, configured to determine, for the each of the currently pending bids, whether or not a corresponding bidder has selected that the bid use the optional automatic bidding feature;

means for generating an ordered bid list by ordering the plurality of currently pending bids by criteria comprising for each currently pending bid using the optional automatic bidding feature, a maximum amount to which the bid may be increased via the optional automatic bidding feature, and for each currently pending bid not using the optional automatic bidding feature, a static bid amount; and means for assigning a winning bid quantity and a winning bid amount to each bid in the ordered bid list based on an ordering of the bid list.

* * * * *

UNITED STATES PATENT AND TRADEMARK OFFICE
CERTIFICATE OF CORRECTION

Page 1 of 1

PATENT NO. : 8,533,095 B2
APPLICATION NO. : 10/118647
DATED : September 10, 2013
INVENTOR(S) : Gill It is certified that error appears in the above-identified patent and that said Letters Patent is hereby corrected as shown below:

In the Specification

In column 6, line 44, before "proceeds" insert -- 10 --.

Signed and Sealed this
Thirty-first Day of December, 2013

Margaret A. Focarino
*Commissioner for Patents of the United States Patent and Trademark Office*